(12) United States Patent
D'Aluisio et al.

(10) Patent No.: US 10,526,035 B2
(45) Date of Patent: Jan. 7, 2020

(54) SUSPENSION ASSEMBLY AND BICYCLE HAVING A SUSPENSION ASSEMBLY

(71) Applicant: Specialized Bicycle Components, Inc., Morgan Hill, CA (US)

(72) Inventors: Christopher P. D'Aluisio, Corralitos, CA (US); Jean-Luc Callahan, San Jose, CA (US); Tyler Kraus, San Jose, CA (US); Conner Swarthout, Morgan Hill, CA (US); Michael McAndrews, Aptos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 15/979,134

(22) Filed: May 14, 2018

(65) Prior Publication Data

US 2018/0257735 A1 Sep. 13, 2018

Related U.S. Application Data

(63) Continuation of application No. 15/191,401, filed on Jun. 23, 2016, now Pat. No. 9,994,279.

(60) Provisional application No. 62/191,162, filed on Jul. 10, 2015, provisional application No. 62/317,307, filed on Apr. 1, 2016, provisional application No. 62/344,012, filed on Jun. 1, 2016, provisional application No. 62/350,870, filed on Jun. 16, 2016.

(51) Int. Cl.
| | | |
|---|---|---|
| *B62K 19/32* | (2006.01) | |
| *B62K 21/20* | (2006.01) | |
| *B62K 21/22* | (2006.01) | |

(52) U.S. Cl.
CPC ............ *B62K 19/32* (2013.01); *B62K 21/20* (2013.01); *B62K 21/22* (2013.01); *B62K 2201/04* (2013.01)

(58) Field of Classification Search
CPC ........ B62K 19/32; B62K 21/20; B62K 21/22; B62K 2201/04
See application file for complete search history.

(56) References Cited

U.S. PATENT DOCUMENTS

| | | | |
|---|---|---|---|
| 2,687,898 A | 8/1954 | Schwinn | |
| 4,881,750 A * | 11/1989 | Hartmann | .............. B62K 21/20 280/276 |

(Continued)

FOREIGN PATENT DOCUMENTS

| | | |
|---|---|---|
| DE | 586849 | 10/1933 |
| FR | 338313 | 5/1904 |

(Continued)

*Primary Examiner* — Kevin Hurley
*Assistant Examiner* — Michael R Stabley
(74) *Attorney, Agent, or Firm* — Knobbe Martens Olson & Bear LLP

(57) ABSTRACT

A suspension assembly for a bicycle comprises a lower tubular support configured to be received within a steerer tube of a bicycle fork assembly; an upper tubular support configured to be connected to a stem of a steering assembly above an upper end of the steerer tube; and a spring configured to exert a force that biases the upper and lower tubular supports toward an extended position, wherein the upper and lower tubular supports are configured such that the upper tubular support slides longitudinally relative to the lower tubular support adjacent the stem and above a fork crown of the bicycle fork assembly.

20 Claims, 12 Drawing Sheets

(56) References Cited

U.S. PATENT DOCUMENTS

| | | |
|---|---|---|
| 4,939,950 A | 7/1990 | Girvin |
| 5,163,697 A | 11/1992 | Kastan |
| 5,186,074 A | 2/1993 | Arnold |
| 5,308,099 A | 5/1994 | Browning |
| 5,350,185 A | 9/1994 | Robinson |
| 5,380,026 A | 1/1995 | Robinson |
| 5,501,477 A | 3/1996 | Moreau |
| 5,509,676 A | 4/1996 | Fukutake et al. |
| 5,511,444 A | 4/1996 | Clausen et al. |
| 5,564,671 A | 10/1996 | Cheng |
| 5,622,132 A | 4/1997 | Mardikian |
| 5,634,653 A | 6/1997 | Browning |
| 5,752,711 A | 5/1998 | Moreau |
| 5,911,428 A | 6/1999 | Ueda et al. |
| 6,988,740 B2 | 10/2006 | Bobrovniczky |
| 7,540,516 B2 | 4/2009 | Arnce |
| 8,317,214 B2 | 11/2012 | Athanasiou |
| 9,085,337 B2 | 7/2015 | Jordan et al. |
| 9,926,033 B1 | 3/2018 | Tsai |
| 9,994,279 B2 | 6/2018 | D'Aluisio et al. |
| 2001/0045721 A1 | 11/2001 | Heydenreich |
| 2005/0109152 A1 | 5/2005 | Hsu |
| 2005/0236802 A1 | 10/2005 | Bobrovniczky |
| 2006/0055145 A1 | 3/2006 | Tsai |
| 2008/0006496 A1 | 1/2008 | Jordan et al. |
| 2008/0315550 A1 | 12/2008 | Parker |
| 2009/0072459 A1 | 3/2009 | Tsai |
| 2011/0239814 A1 | 10/2011 | Athanasiou |
| 2013/0056952 A1 | 3/2013 | Barkley |
| 2015/0136540 A1 | 5/2015 | Lucas |

FOREIGN PATENT DOCUMENTS

| | | |
|---|---|---|
| FR | 402449 | 10/1909 |
| FR | 869809 | 2/1942 |
| FR | 1312987 | 12/1962 |
| GB | 347067 | 4/1931 |
| TW | 358785 U | 6/1998 |

\* cited by examiner

SUSPENSION ASSEMBLY AND BICYCLE HAVING A SUSPENSION ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present invention relates to a suspension assembly and more specifically to a suspension assembly for suspending the handlebar of a bicycle.

Description of Related Art

Bicycles designed for paved roads commonly have a front fork including fork legs configured to receive the front wheel. A steerer tube is rotationally received in a head tube of the bicycle frame and a stem attaches the steerer tube and a steering assembly. In some riding conditions, such as when riding long distances or over rough roads, it would be desirable to reduce the amount of shock or vibration transmitted from the road via front wheel to the rider. One way to accomplish this is to provide a stem-based suspension assembly having a parallelogram linkage, which facilitates absorbing of the shock and vibration.

SUMMARY

In one aspect, the present disclosure provides a bicycle including a frame, a front fork assembly, a suspension assembly and a steering assembly. The frame includes a head tube which rotatably receives the front fork assembly. The front fork assembly has a pair of tubular fork legs that are connected to a fork crown at one end. A steerer tube projects axially away from the fork crown and is rotationally received in the head tube.

The suspension assembly is received within an inner diameter of the steerer tube such that it projects above an upper end of the steerer tube. The suspension assembly includes a lower tubular support and an upper tubular support longitudinally slidable relative to the lower support. The lower and upper supports receive a first positive biasing means and a first negative biasing means. As used herein, "biasing means" includes coil springs, air springs, elastomeric springs, resilient foam, or other structures that have similar resilient characteristics.

The steering assembly includes a stem that is connected to the upper support.

The lower and upper supports are respectively connected to the steerer tube and the stem such that the upper support slides longitudinally relative to the lower support adjacent the stem and above the fork crown.

According to another aspect of the present disclosure, a connector assembly is configured to secure the suspension assembly within the steerer tube. In one aspect the connector assembly includes a pinch collar that circumferentially receives the steerer tube. The pinch collar reversibly secures the suspension assembly within the steerer tube via a threaded connector.

In another aspect, the frame also includes a top tube connected to an upper end of the head tube. The steerer tube is configured such that the lower support is received above the top tube.

In another aspect, at least one spacer is received intermediate an upper end of the head tube and the suspension assembly. In one aspect the at least one spacer comprises a hood.

In another aspect, the positive biasing means exerts a first biasing force on first and second surfaces of the suspension assembly and the negative biasing means exerts a second biasing force on third and fourth surfaces of the suspension assembly.

In another aspect, the suspension assembly includes a third biasing means. In one aspect, the third biasing means is a second positive biasing means. In another aspect, the third biasing means exerts a third biasing force on fifth and sixth surfaces of the suspension assembly.

According to one aspect of the present disclosure, at least one biasing means is replaceable without disassembling the suspension assembly.

In another aspect, an outer diameter of the suspension assembly is less than an inner diameter of the steerer tube.

In another aspect, an intermediate tubular support is received intermediate the upper and lower supports and configured to minimize lateral movements between the upper and lower supports.

In another aspect, the intermediate tubular support receives a plurality of bearings.

In another aspect, the upper support receives an externally adjustable interface configured to provide variable tension on the first positive biasing means.

According to one aspect of the present disclosure, the present disclosure provides a suspension assembly for a bicycle, comprising lower and upper tubular supports, a first spring and a second spring.

The lower tubular support is configured to be received within a steerer tube of a bicycle fork assembly. The upper tubular support is configured to be connected to a stem of a steering assembly. The upper support is longitudinally slidable relative to the lower support.

The first spring comprises a positive spring that exerts a first spring force on the upper and lower supports when a compression force is exerted on the suspension assembly. The second spring comprises a negative spring that exerts a second spring force opposite the first spring force on the upper and lower supports when an extension force is exerted on the suspension assembly.

The upper and lower supports are configured such that the upper support slides longitudinally relative to the lower support adjacent the stem and above a fork crown of the bicycle fork assembly.

In another aspect, the lower support is configured to be received within a steerer tube such that an upper end of the lower support is disposed above a top tube of the bicycle.

In another aspect, the first spring exerts the extension force on a first surface and a second surface, and the second spring exerts the compression force on a third surface and a fourth surface.

In another aspect a third spring is disposed within one of the supports of the suspension assembly such that it exerts a third spring force in a direction parallel to the first spring force on the upper and lower supports when the compression force is exerted on the suspension assembly. In one aspect, the third spring comprises a second positive biasing means. In another aspect the third biasing means exerts the third spring force upon a fifth surface and a sixth surface of the suspension assembly.

In another aspect, the suspension assembly is configured such that at least one spring is replaceable without removing the lower tubular support from the steerer tube.

In another aspect, an outer diameter of the lower tubular support is less than an inner diameter of a standard steerer tube.

In another aspect, the steerer tube defines a steering axis and the suspension assembly defines a longitudinal axis parallel with the steering axis. In one aspect, the longitudinal axis is coaxial with the steering axis.

In another aspect, the upper support receives an externally adjustable interface configured to provide variable tension on the first spring.

In another aspect, an intermediate tubular support is received intermediate the upper and lower supports and configured to minimize lateral movement between the upper and lower supports.

In another aspect, the intermediate tubular support receives a plurality of bearings.

One aspect of the invention is that it would be desirable to provide a suspension assembly that provides suspension along an axis that is coaxial with a rotational axis of a front wheel of a bicycle.

Another aspect of the invention is that it would be desirable to have a suspension assembly that provides the rider with opportunity to customize suspension characteristics and improve handling characteristics of the bicycle.

Other aspects of the invention will become apparent by consideration of the detailed description and the accompanying drawings.

DETAILED DESCRIPTION

FIGS. 3-6 illustrate a bicycle 1000 according to aspects of the present disclosure. The bicycle 1000 includes a frame 1002 including a head tube 1003, a top tube 1005, a seat tube 1007 and a down tube 1009. The top tube 1005 is connected to the head tube 1003 at a first or forward end and connected to the seat tube 1007 at a second or rearward end. The down tube 1009 is connected to the head tube 1003 at a first or forward end and connected to a bottom bracket assembly 1011 at a second or rearward end. The bottom bracket assembly 1011 rotationally receives a crank assembly 1013 that couples to a chain (not shown). The chain engages the rear wheel 1019 through a series of rear sprockets mounted to a hub (not shown).

Front and rear dropouts 1001 and 1025 rotationally secure front and rear wheels 1006 and 1019 to the bicycle 1000. The front dropouts 1001 are defined at a lower end of a front fork assembly 1004. A pair of chainstays 1021 are connected to the bottom bracket 1011 at first or forward chainstay ends and a pair of seatstays 1023 are connected to the seat tube 1007 at first or forward seatstay ends. The chainstays 1021 and seatstays 1023 are connected to each other at second or rearward ends. The rear dropouts 1025 are defined at the connection of the chainstays 1021 and seatstays 1023. The chainstays are connected to the bottom bracket assembly 1011 at an end of the chainstays 1021 opposite the dropouts, and the seatstays 1023 are connected to the seat tube at an end of the seatstays 1023 opposite the dropouts.

Figure 6:
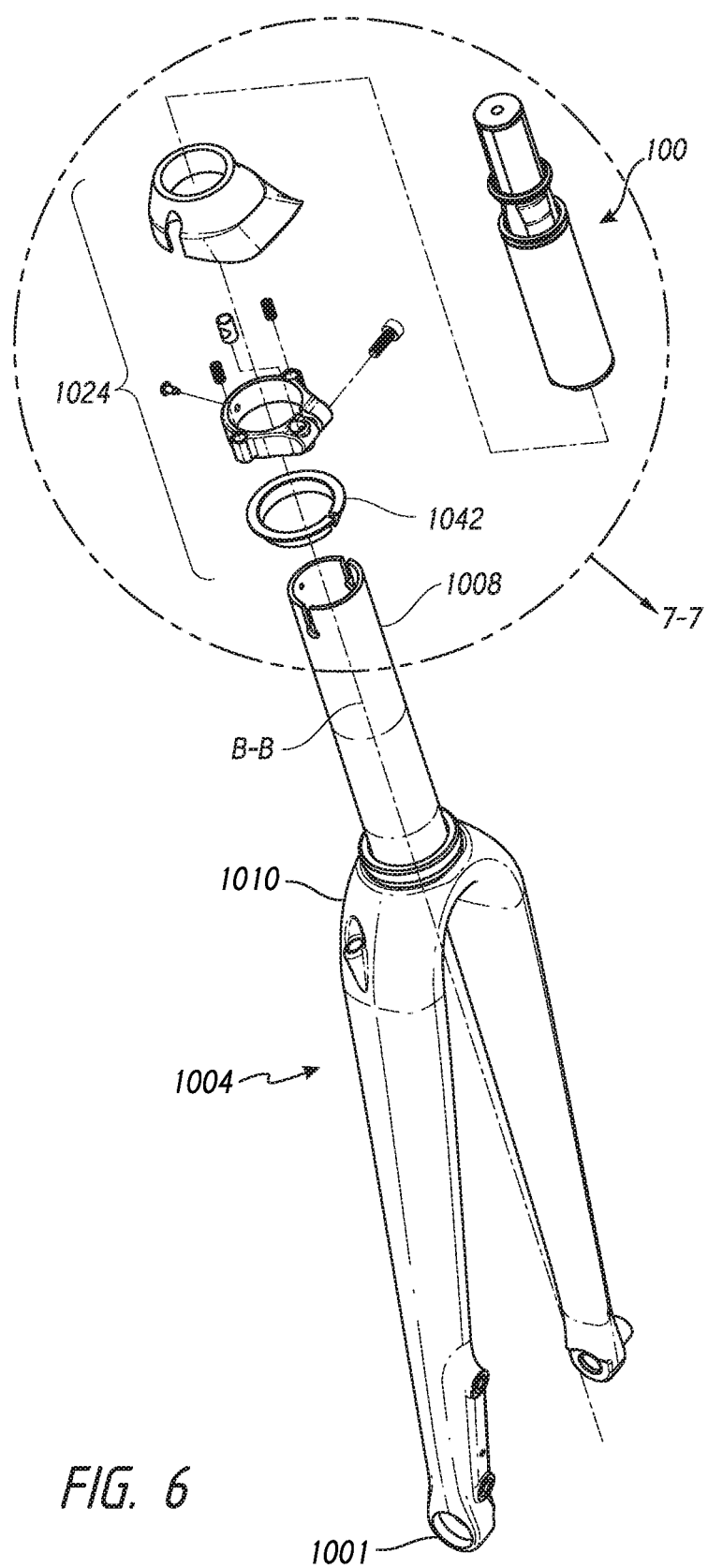
FIG. 6 shows an exploded view of the front fork, suspension assembly and connector assembly.
Figure 7:
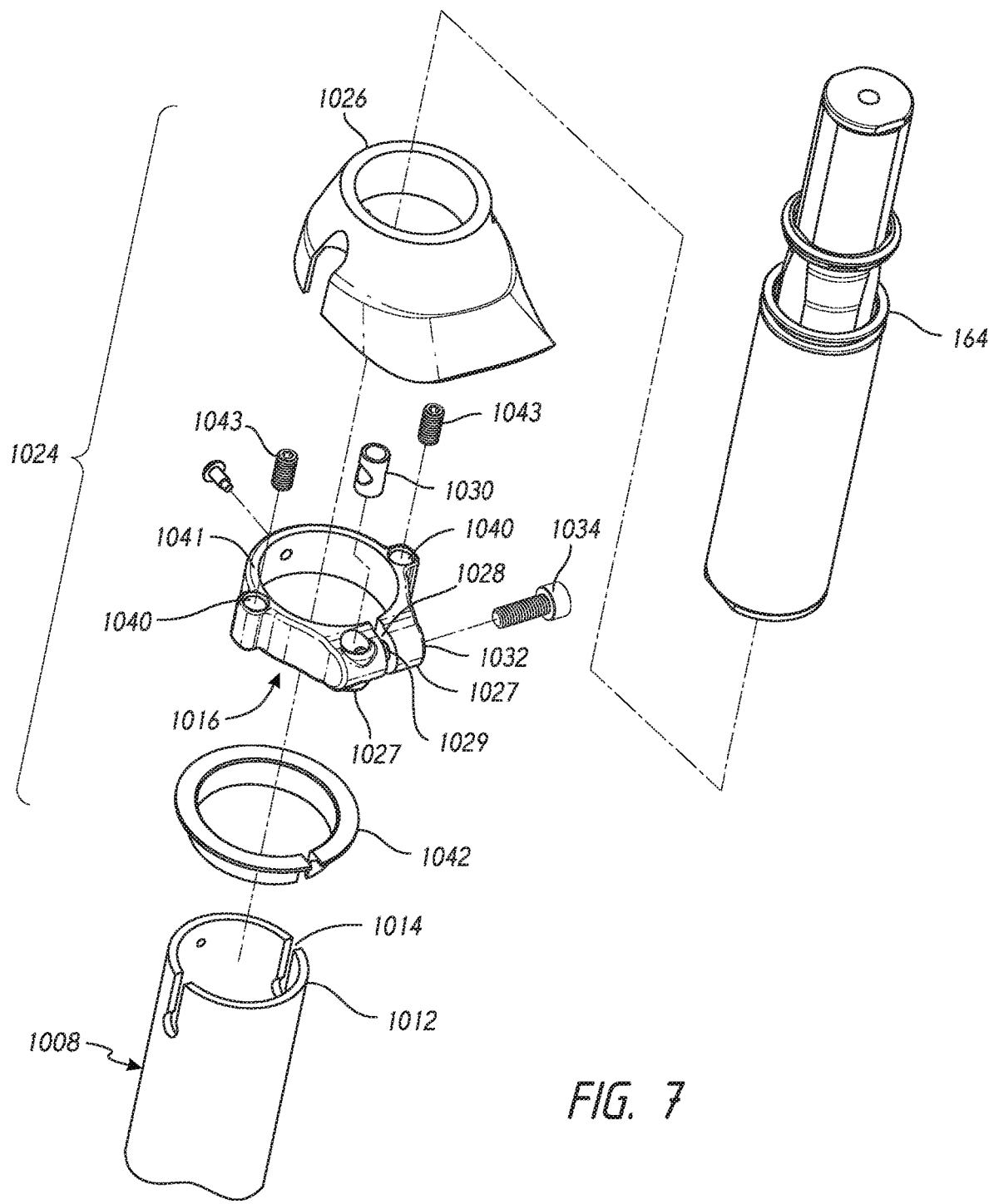
FIG. 7 shows an enlargement of the area 7-7 of FIG. 6.

The front fork assembly 1004 is mounted within the head tube 1003 for rotation about a steering axis B-B. FIGS. 6 and 7 depict the fork assembly 1004, a suspension assembly 100 (described in greater detail below) and a connector assembly 1024; the frame 1002 and the other portions of the bicycle are omitted for clarity. As best seen in FIG. 6, a steerer tube 1008 coaxial with the steering axis B-B projects from a fork crown 1010 at an upper end of the fork assembly 1004. As will be described in greater detail below, the suspension assembly 100 is received within an inner diameter of the steerer tube 1008 such that an upper support 102 slides longitudinally relative to a lower support 104 adjacent a stem 1020 of a steering assembly 1018. Moreover, the suspension assembly is connected to the steerer tube 1008 so as to provide suspension in a direction parallel to or coaxial with the steering axis B-B.

Figure 1:
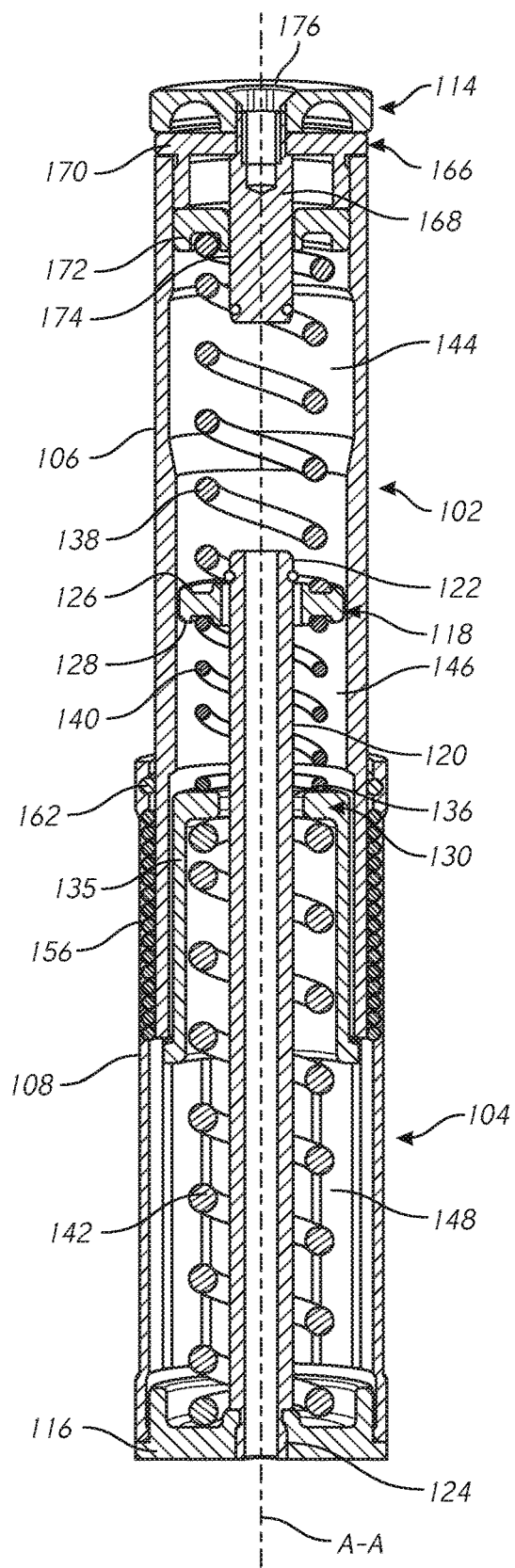
FIG. 1 shows a cross-sectional side view of an embodiment of a suspension assembly in accordance with the present disclosure.
Figure 1A:
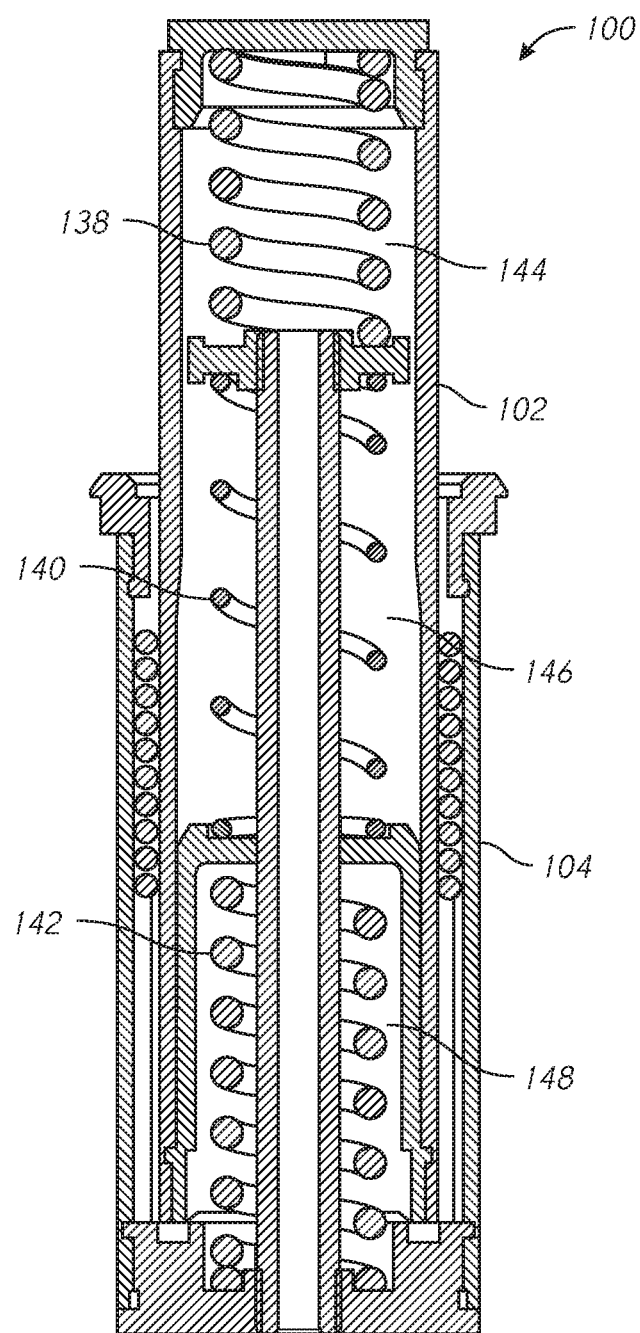
FIG. 1A shows a cross-sectional side view of the suspension assembly of FIG. 1 in a fully-compressed position.
Figure 2:
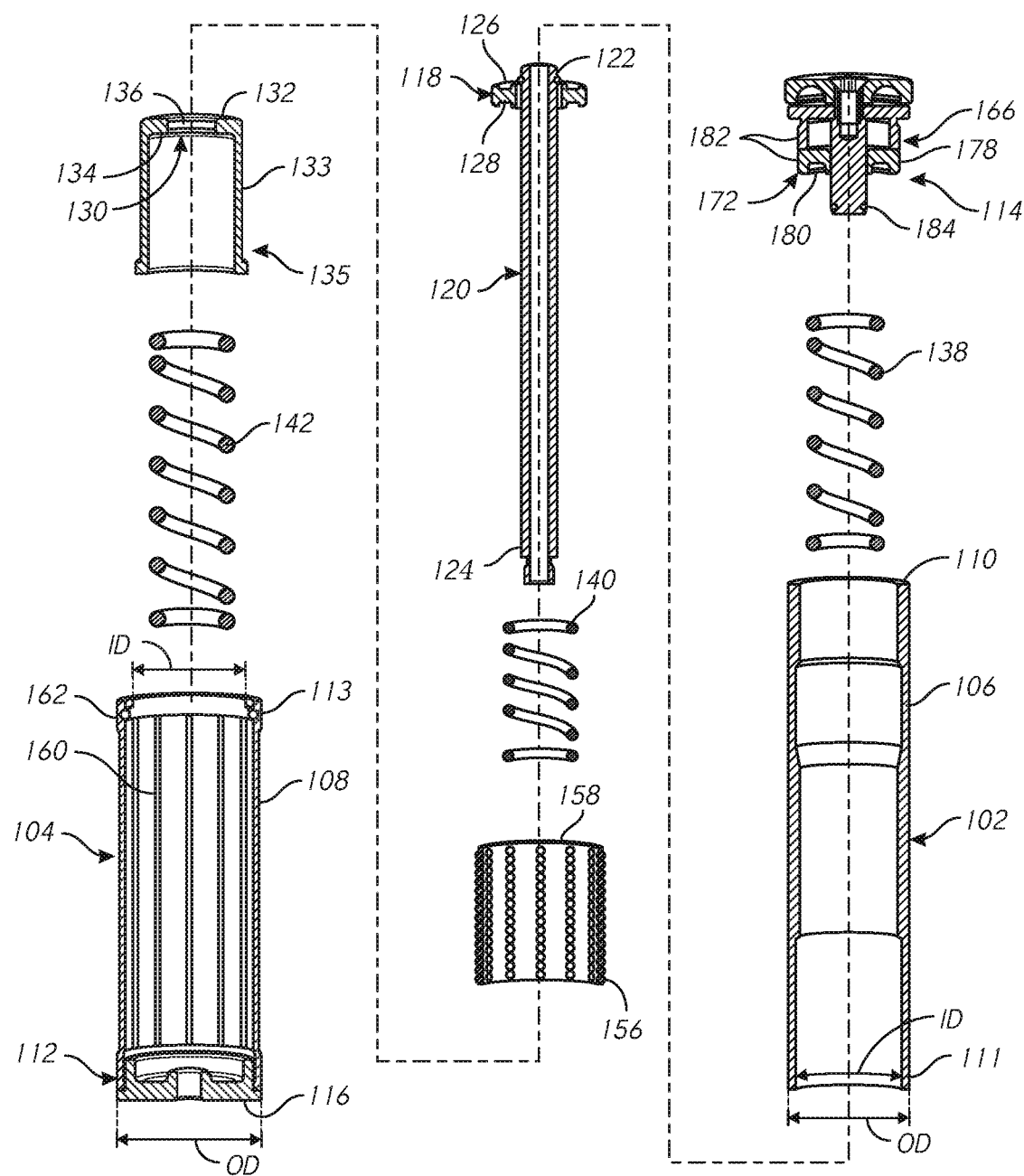
FIG. 2 shows an exploded cross-sectional side view of the suspension assembly of FIG. 1.

FIGS. 1 and 2 depict the suspension assembly 100. The suspension assembly 100 includes upper and lower tubular supports, 102 and 104 and a longitudinal axis A-A. The upper and lower tubular supports 102, 104 each include sidewalls 106, 108 having inner and outer diameters. As used herein, the term "tubular support" shall mean a tube having a generally cylindrical sidewall, however one of ordinary skill in the art will recognize that the suspension assembly could be modified such that the sidewalls have a non-round sectional shape without departing from the scope of the claims.

With reference to FIG. 2, the inner diameter ("ID") of the lower tubular support 104 is configured to telescopically receive the outer diameter ("OD") of the upper tubular support 102. As will be discussed in greater detail below, the upper and lower tubular supports 102 and 104 are joined such that upper support 102 slides longitudinally relative to the lower support 104, and the suspension assembly 100 is compressible between a first length $L_1$ and a second length $L_2$, and extensible between the first length $L_1$ and a third length $L_3$.

As shown in FIG. 2, the upper tubular support has a first longitudinal end 110 which receives a first end cap 114, and the lower tubular support has a second longitudinal end 112 which receives a second end cap 116. Referring to FIGS. 1 and 2, a piston 118 is disposed within the sidewalls 106 and 108 of the upper and lower tubular supports 102, 104. The piston 118 is connected to a piston rod 120 at a piston rod first end 122. The piston rod projects axially into the suspension assembly 100 from the lower tubular support second end 112, as the piston rod is connected to the second end cap 116 at a piston rod second end 124. The piston has first and second surfaces 126 and 128.

A partition 130 having first and second surfaces 132, 134 is located adjacent the upper tubular support second end 111. In the embodiment illustrated in FIGS. 1 and 2, the partition 130 is disposed at one end of a sidewall 133 of a cap 135 connected to the upper tubular support second end 111 by a threaded connection. The upper tubular support may have an ID adjacent the second end 111 specifically sized to receive the partition 130. The partition 130 defines a through-hole 136 coaxial with the longitudinal axis A-A. As best seen in FIG. 1 the through-hole 136 is defined to receive the piston rod 120 and allow the piston rod to reciprocate as the suspension assembly 100 compresses and extends between the first and second lengths $L_1$ and $L_2$.

Referring to the embodiment shown in FIGS. 1 and 2, first, second and third springs 138, 140 and 142 are arranged within first, second and third compartments 144, 146 and 148 defined within the suspension assembly 100. The first end cap 114, the upper tubular support sidewall 106 and the piston 118 cooperatively define the first compartment 144, which receives the first spring 138. The piston 118, the partition 130 and the upper tubular support sidewall 106 define the second compartment 146, which receives the second spring 140. The partition 130, the second end cap 116 and the lower tubular support sidewall 108 define the third compartment 148, which receives the third spring 142. In the illustrated embodiment, the upper tubular support also cooperates to define the third compartment 148, as the cap 135 is received within the first end 111 of the upper tubular support 102 such that the partition 130 is disposed inward of the first axial end 111. As will be discussed in greater detail below, the illustrated suspension assembly 100 is configured such that the first and third springs 138, 142 act as first and second positive biasing means, and the second spring 140 acts as a first negative biasing means. While the first, second and third springs 138, 140, 142 are depicted as coil springs, one of ordinary skill will recognize that the suspension assembly can be modified such that other types of springs (i.e. air springs) can be substituted without departing from the scope of the invention.

In the embodiment illustrated in FIGS. 1 and 2, a plurality of bearings are disposed intermediate the upper tubular support and the lower tubular support where they overlap. As best seen in FIG. 2, the bearings are received in a third tubular member 158 which defines a plurality of holes sized to receive the bearings. The bearings are depicted as ball bearings 156 in the illustrated embodiments; however, the ball bearings 156 could be replaced by a plurality of needle roller bearings without departing from the scope of this disclosure. With further reference to FIG. 2, an inner surface of the lower tubular support 104 and an outer surface of the upper tubular support 102 may define a plurality of axially oriented grooves 160 sized to receive the bearings. In an alternative embodiment, the axially oriented grooves 160 may receive the bearings and the third tubular member 158 may be omitted.

Additionally, the ball bearings 156 of the illustrated embodiment can have one of a plurality of different diameters. The diameter of the bearing can be specifically chosen to minimize lateral movement between the upper and lower tubular supports 102, 104. Accordingly, manufacturing tolerances in the inner and outer diameter of the upper and lower tubular supports 102, 104 may be accommodated during assembly of the suspension assembly 100.

Figure 5:
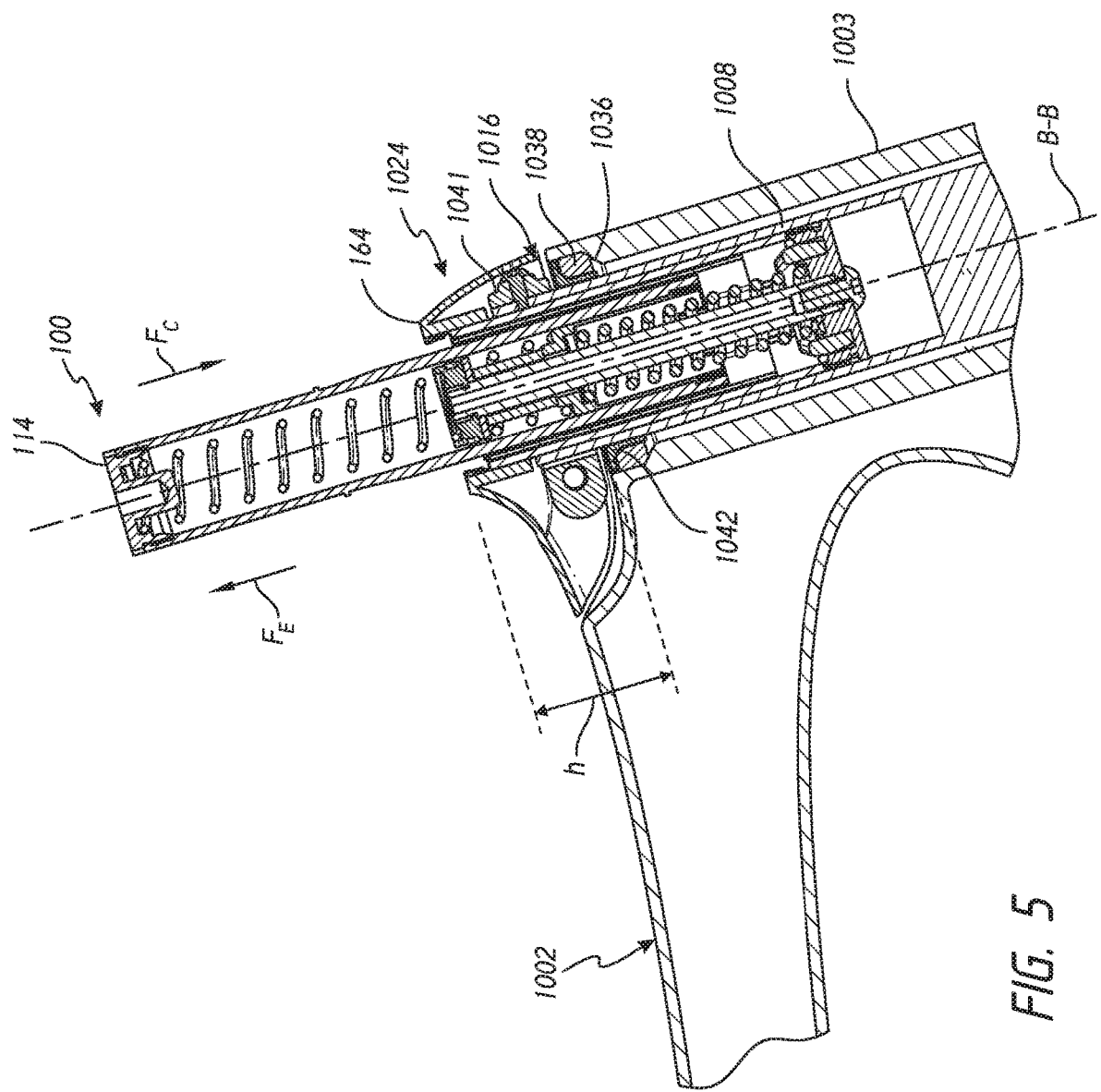
FIG. 5 shows a cross-sectional side view of the area in FIG. 3 demarcated by circle 4-4.

Referring to the embodiments shown in FIGS. 1, 5 and 7, the suspension assembly lower tubular support 104 includes a radially outwardly projecting shoulder disposed adjacent the lower tubular support first axial end 113. The shoulder may be an integrally formed shoulder 162 with the lower tubular support 104 as shown in FIG. 1, or alternatively the shoulder may comprise a separate cylindrical collar 164 that is secured to the lower tubular support first axial end 113, as shown in FIGS. 5 and 7. Referring to FIG. 5, the suspension assembly 100 is received within the ID of the steerer tube 1008 and the collar 164 abuts a hood 1026 of a connector assembly 1024 (described in greater detail below) to ensure that the suspension assembly does not fall into the steerer tube 1008 during installation.

The steering assembly 1018 (FIGS. 3 and 4) is connected to the suspension assembly 100 by the stem 1020. Referring to FIG. 4, the stem 1020 is secured to the upper tubular support 102 of the suspension assembly 100 via a clamping portion 1022 having a plurality of pinch bolts as is known in the art. The stem 1020 is secured to the upper tubular support 102 adjacent the first end cap 114 such that the upper tubular support may longitudinally slide relative to the lower support 104 a distance d. The distance d is equal to an amount of clearance between the stem where it is secured to the upper tubular support and the first longitudinal end 113 of the lower tubular support 104. As best seen in FIG. 1C, the distance d is equal to the difference between the first and second lengths $L_1$ and $L_2$ of the suspension assembly 100, and in one embodiment d is approximately 20 mm. Stated differently, the distance d is equal to the amount of travel of the suspension assembly 100.

The stem typically provides axial retentive forces which secure prior art front fork assemblies within the head tube. The embodiment of the connector assembly 1024 illustrated in FIGS. 5-7 provides the axial retentive forces to secure the front fork assembly 1004 within the head tube 1003, and additionally secures the suspension assembly 100 within the steerer tube 1008. The illustrated connector assembly 1024 includes a hood 1026 and a collar 1016. Circumferential ends 1027 of the collar 1016 define a gap 1028. A cavity 1029 defined adjacent one circumferential end is configured to receive a female portion 1030 of a threaded connector system, while the other circumferential end defines a through hole 1032 configured to receive a length of a male portion 1034 of the threaded connector system.

In the embodiment shown in FIGS. 6 and 7, the steerer tube defines an axially oriented slot 1014 which communicates with the rim 1012. To rotationally secure the front fork assembly near the front end of the bicycle 1000, the collar 1016 surrounds the steerer tube adjacent the rim 1012 and draws the circumferential ends 1027 toward one another circumferentially tightening the collar 1016 around the steerer tube 1008 at the rim 1012. Tightening the collar 1016 pinches the slot 1014 thereby narrowing the steerer tube at the rim 1012 and securing the suspension assembly 100 within the steerer tube 1008. Additionally, circumferentially tightening the collar 1016 around the steerer tube 1008 axially positions the collar 1016 on the steerer tube 1008. Circumferentially tightening the collar 1016 around the steerer tube 1008 simultaneously secures the fork assembly 1004 within the head tube 1003, between the collar 1016 and the fork crown 1010. The steerer tube is received above the fork crown 1010, and is received at least partially within and partially above the rim 1012 of the steerer tube 1008. The suspension assembly is received within the steerer tube 1008 and the stem is attached to the upper tubular member such that the upper support slides longitudinally relative to the lower support adjacent the stem 1020 and above the fork crown 1010. With reference to the embodiment depicted in FIGS. 5, 8 and 9, the steerer tube 1008 may receive the lower support 104 first axial end 113 above the top tube 1002, such that the upper support 102 slides longitudinally relative to the upper support 104 at least partially above the top tube 1002.

As best shown in FIG. 5, the head tube 1003 defines at least one bearing seat 1036 configured to receive a bearing. In the illustrated embodiment, the bearing seat 1036 receives a cartridge bearing 1038, although other bearings could be used. Referring to FIGS. 5-7, the collar 1016 includes a flange 1041 which acts as a preload mechanism. The preload mechanism further includes a washer 1042 and male threaded connector members 1043 which pass through the flange 1041 and engage the washer 1042 to adjust the preload on the cartridge bearing 1038. The collar 1016 defines a plurality of holes 1040 which form the female portion of a threaded connection with the male threaded connector members 1043. The pre-load mechanism ensures that there is no play between the collar 1016 and the cartridge bearing 1038. Stated differently, the flange 1041 of the collar 1016 ensures that the cartridge bearing 1038 does not rattle within the bearing seat 1036 of the head tube 1003 during riding.

Referring to FIG. 5, the hood 1024 has a height h, which may determine the position of the steering assembly 1018 relative to the head tube 1003 and top tube 1005. A number of different hoods each having differing heights may be offered as a set to allow a rider to selectively adjust the vertical position of the steering assembly 1018. Alternatively, a plurality of cylindrical spacer members (not shown) may be utilized in lieu of or in addition to the hood 1024 to provide the desired position of the steering assembly 1018.

Figure 8:
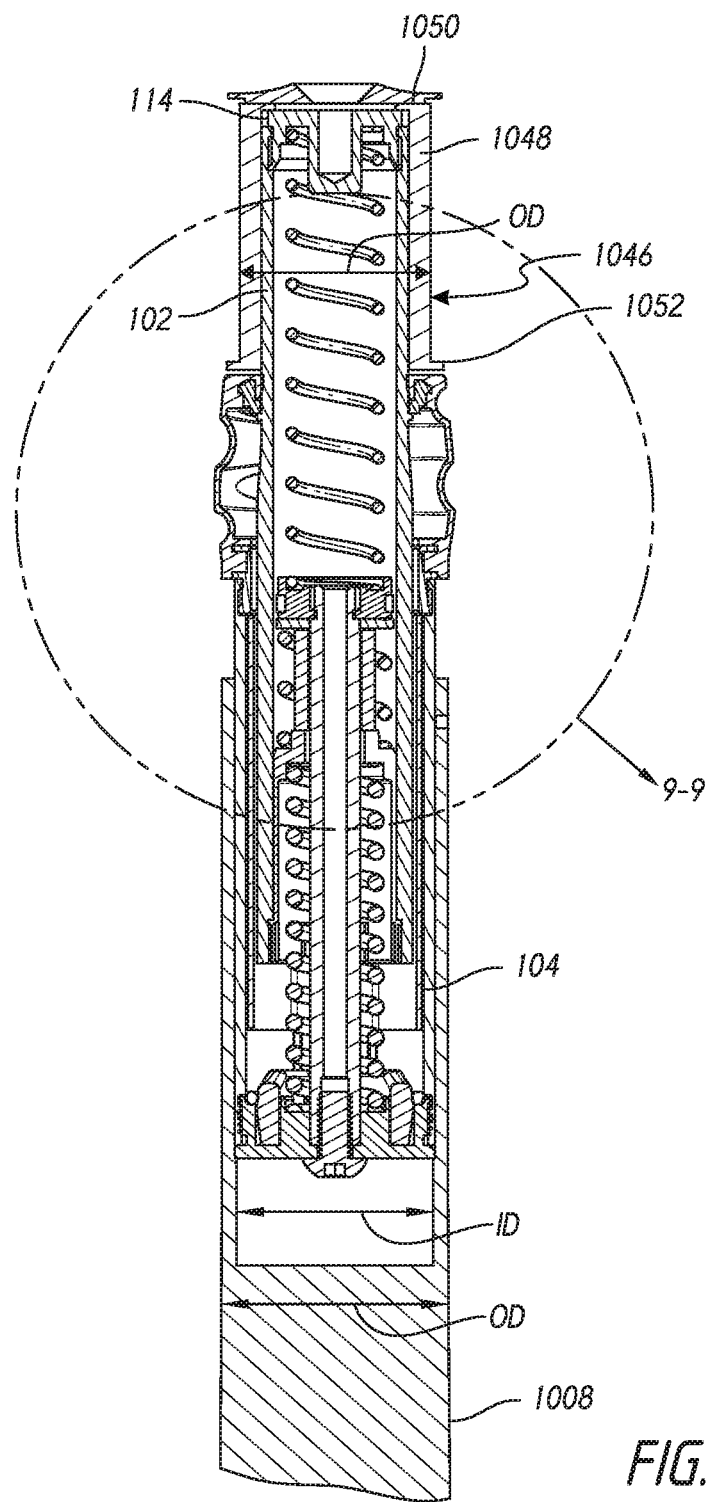
FIG. 8 shows a cross-sectional side view of one embodiment of a steerer tube and suspension assembly in accordance with the present disclosure.
Figure 9:
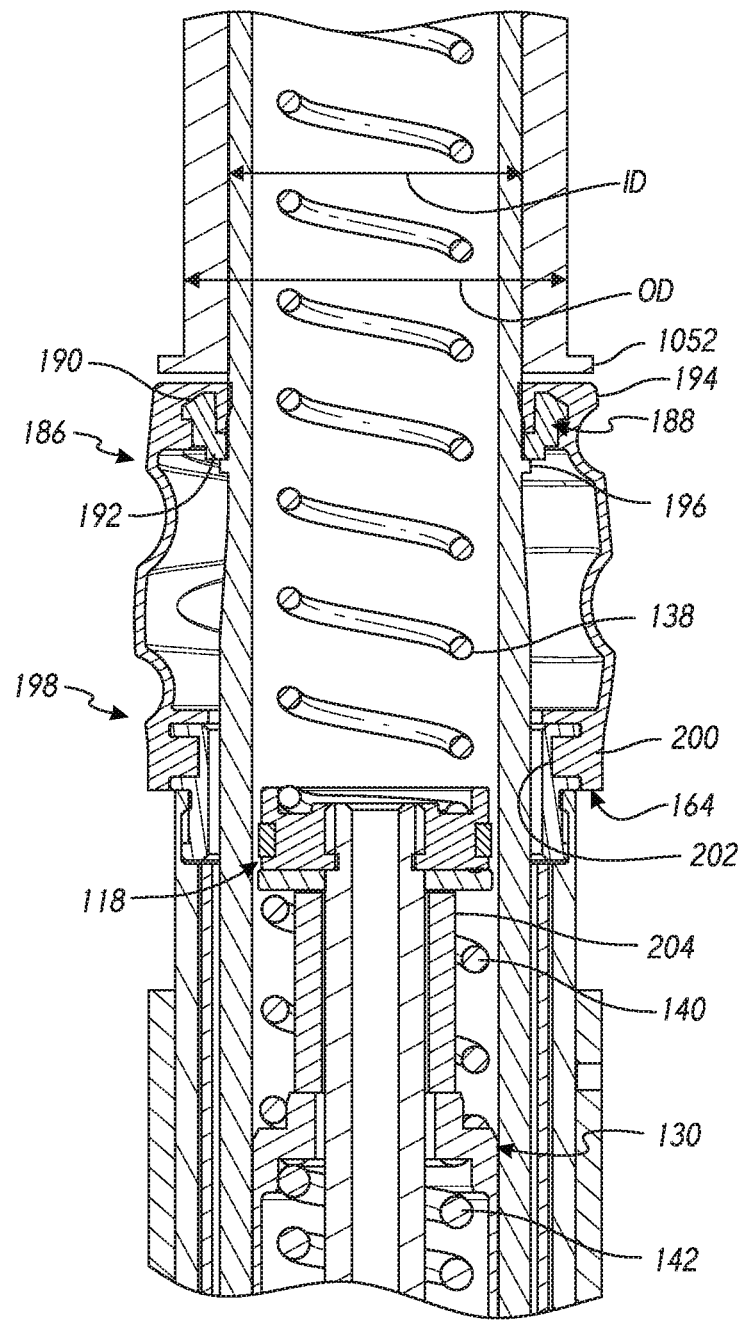
FIG. 9 shows an enlargement of the area 9-9 of FIG. 8.

FIGS. 8 and 9 show one embodiment of the steerer tube 1008 receiving the suspension member 100 in accordance with the present disclosure; the frame 1002, steering assembly 1018 and other portions of the bicycle are omitted for clarity. In the illustrated embodiment, an adjustor 1046 is provided that includes a sidewall 1048 having an ID and an OD. The adjustor 1046 further includes upper and lower radially projecting shoulders 1050, 1052. The adjustor ID is sized to receive the upper tubular support 102 such that the upper radially projecting shoulder 1050 rests upon the upper tubular support end cap 114, and the adjustor OD is approximately the same as an OD of the steerer tube 1008. The OD of the upper and lower tubular supports 102, 104 are sized to be smaller than the OD of the steerer tube so that the OD of the lower tubular support 104 may fit within the ID of the steerer tube 1008 as described above. The clamping portion 1022 of commercially available stems 1020 are sized to fit a steerer tube 1008 having a commercially standardized set of dimensions. For example, many bicycles designed for riding at high speeds on paved roads include a steerer tube having an OD at the end opposite the fork crown 1010 (see also FIG. 6) that typically measure 1 inch (25.4 mm) or 1⅛ inches (28.6 mm). The clamping portion 1022 for most commercially available stems 1020 has an ID that is slightly larger than the steerer tube OD so that the stem clamping portion 1022 can receive the steerer tube OD and secure the steerer tube within the head tube by tightening the clamping portion pinch bolts. Accordingly, the adjustor 1048 facilitates use of a commercially available steerer tube 1008 and stem 1020, obviating the need to manufacture and source custom components for the bicycle 1000 of the present disclosure.

Referring to the embodiment of the suspension assembly 100 shown in FIG. 9, a boot 186 is attached to the upper and lower tubular supports 102, 104 and configured to prevent contaminants from entering the suspension assembly 100. The boot 186 includes a connector 188 that is secured by co-molding or bonding with an upper rim of the boot 194. The connector 188 comprises a harder material than the boot 186, reinforcing the upper connection between the boot and the upper tubular support 102. The connector 188 also facilitates a seal between the boot 186 and the upper tubular member 102 in some embodiments. The connector 188 includes a radial outer portion 190 that is secured to the upper rim of the boot 194 and a radial inner portion 192 that abuts a shoulder 196 that projects radially outwards from a surface of the upper tubular member 102. The lower rim 198 of the boot includes a lip 200 that is secured in a cavity 202 defined by the collar 164. In the illustrated embodiment, the lip 200 is retained in the cavity by stretching the lip over the collar and creating an interference fit between the lip 200 and the cavity 202. The boot 186 may be formed form a resilient material such as neoprene to allow the boot to extend and retract during telescopic movement of the suspension assembly 100.

In an embodiment shown in FIGS. 1 and 2, the first end cap 114 includes a user interface 166. The user interface 166 is external to the upper tubular support 102, and can be manipulated when the suspension assembly 100 is installed on the bicycle to provide adjustable tension on the first spring 138, as will be further discussed below. The illustrated user interface 166 includes a male threaded portion 168, a connector portion 170 and a compression member 172 including a female threaded portion 174. The connector portion 170 secures the user interface 166 (and by extension the first end cap 114) within the first end 110 of the upper tubular support 102, and may comprise a threaded, snap fit, bayonet or a number of other connector systems. The male threaded portion 168 communicates with an actuator portion 176 disposed in the first end cap 114. The compression member 172 includes a radially projecting shoulder 178 which engages the first spring 138. In an embodiment best seen in FIG. 2, a surface of the compression member 172 facing the first compartment 144 (FIG. 1) defines an annular cavity 180 that receives an axial end of the first spring 138. The compression member 172 includes at least one radial projection 182 which is received in an axially-oriented slot defined by the upper tubular support 102. In the embodiment shown in FIGS. 1 and 2, where the connector portion 170 comprises a snap fit connector, the connector portion also includes at least one radial projection 182.

The user interface 166 in the illustrated embodiment provides variable compression in a direction coaxial with the longitudinal axis A-A on the first spring 138, thereby providing tension on the suspension assembly 100 and ensuring that the individual components that make up the suspension assembly 100 do not rattle during riding. To increase or decrease the compression on the first spring 138 the actuator 176 is rotated, causing the male threaded portion 168 to rotate within the user interface 166. The at least one radial projection 182 of the compression member 172 (and connector portion 170 in certain embodiments) prevents the compression member 172 from rotating within the upper tubular support 102 when the male threaded portion is actuated by the actuator portion 176. The female threaded portion 174 interacts with the male threaded portion 168 thereby axially moving the compression member 172 within the compression portion 172. A stop member 184 is disposed on an end of the male threaded portion 168 opposite the actuator 176 that prevents the female threaded portion 174 disengaging from the male threaded portion 168.

As shown in FIGS. 1 and 5, the first, second and third springs 138, 140, 142 are received within the first second and third compartments 144, 146, 148 to allow the suspension assembly 100 to compress between a resting configuration defined by a first length $L_1$ and a fully compressed configuration defined by the second length $L_2$ best seen in FIG. 1C. Although the second compartment 146 is disposed intermediate the first and third compartments, the suspension assembly 100 is configured such that the first and third springs 138 and 142 act in parallel as first and second positive biasing means. When a compression force $F_C$ (see FIGS. 4 and 5) is exerted on the suspension assembly 100 the first spring 138 exerts a first positive biasing force against the first end cap 114 and the piston first surface 126 and the third spring 142 exerts a second positive biasing force against the partition second surface 134 and the second end cap 116 as the suspension assembly approaches $L_2$. The combination of the first and second positive biasing forces exerted by the first spring 138 and the third spring 142 results in an overall suspension profile. As used herein, "suspension profile" shall be defined to mean the relative firmness or compliance of the suspension assembly 100 during telescopic movement.

The second spring 140 acts as a top-out spring during extension of the suspension assembly 100, preventing damage to the upper and lower tubular supports 102, 104 in the event that the compression FC force upon the suspension assembly 100 is rapidly removed. As the suspension assembly 100 lengthens and approaches the resting configuration the second spring 140 acts as a first negative biasing means, exerting a first negative biasing force against the piston second surface 128 and the partition first surface 132 to prevent portions of the upper tubular support and lower tubular support from violently colliding.

Figure 1B:
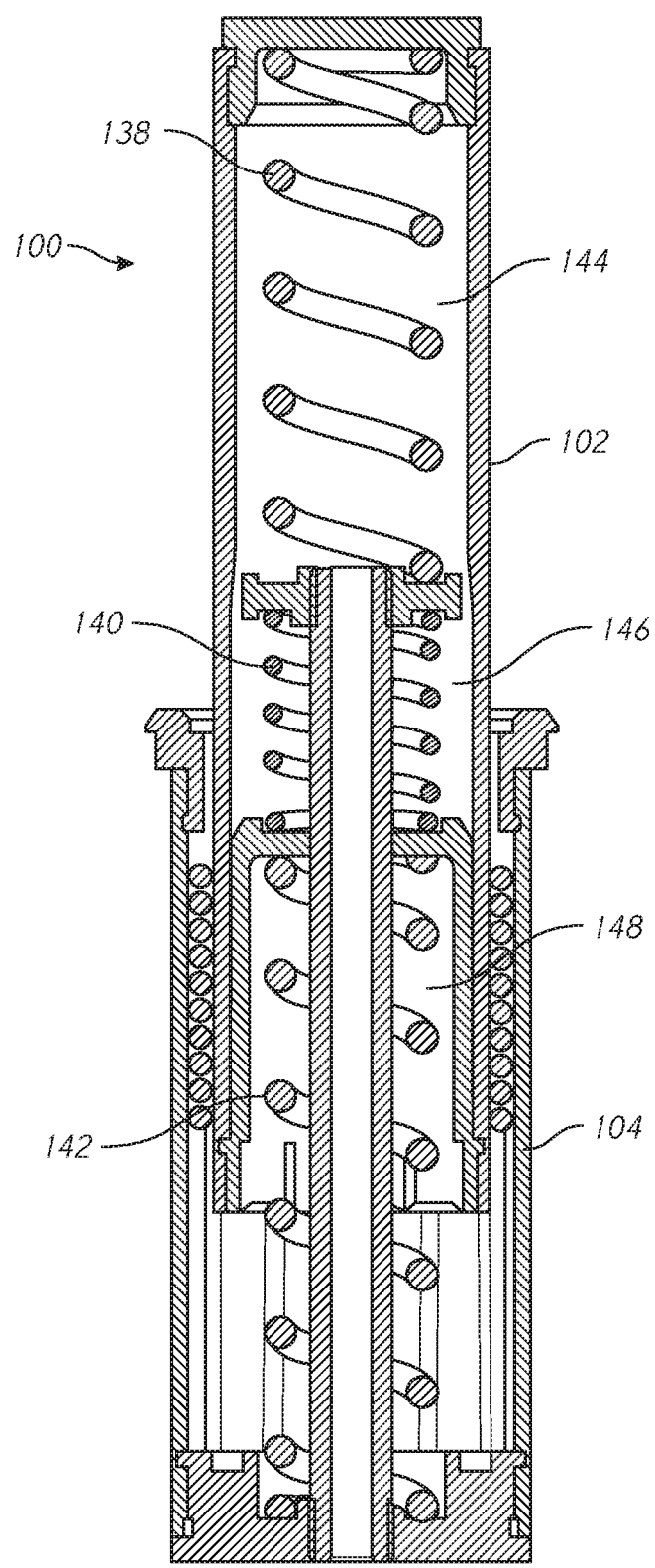
FIG. 1B shows a cross-sectional side view of the suspension assembly of FIG. 1 in a fully-extended position.
Figure 1C:
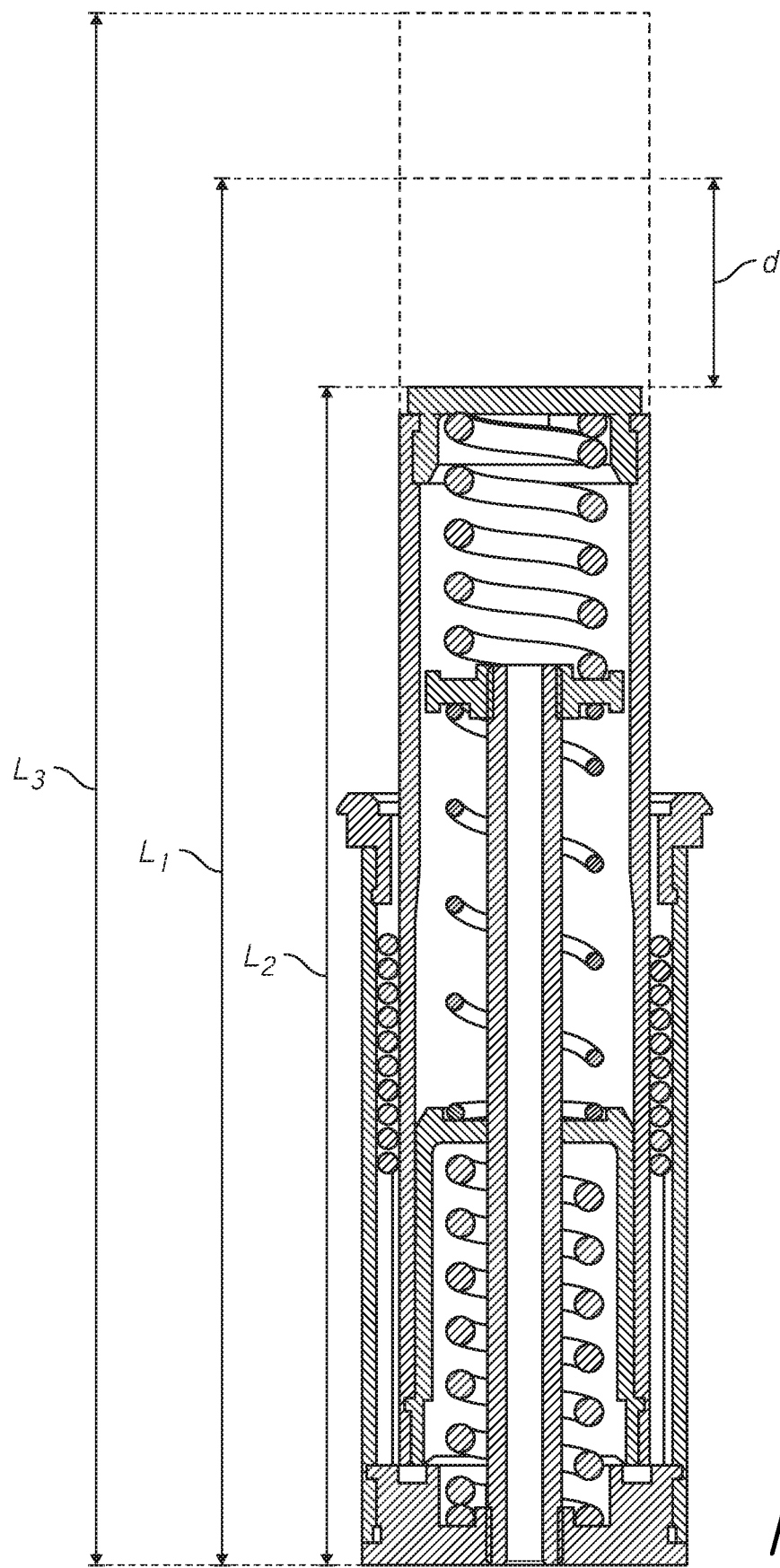
FIG. 1C shows a cross-sectional side view of the suspension assembly of FIG. 1 in the fully-compressed position, with the length of the upper tubular support in the resting and the fully extended position also shown.

In one embodiment shown in FIG. 1B, the suspension assembly 100 is extendable beyond the first length $L_1$ in the resting configuration when an extension force $F_E$ is exerted on the upper tubular support. The extension force $F_E$ may result from a rider pulling upwardly on the handle bar assembly 1020. When the suspension assembly 100 is in the resting configuration and the extension force is exerted in the direction shown in FIGS. 4 and 5, the suspension assembly 100 may lengthen beyond $L_1$ to a fully extended configuration defined by a third length $L_3$, illustrated in FIGS. 1B and 1C. As the suspension assembly 100 lengthens beyond $L_1$, the second spring 140 exerts a biasing force against the partition first surface 132 and the piston second surface 128. As the extension force $F_E$ is removed, the first negative biasing force that the second spring 140 exerts against the partition first surface 132 and the piston second surface 128 biases the suspension assembly 100 into the resting configuration such that the suspension assembly 100 returns to the first length $L_1$. In the embodiment shown in FIG. 9, a bumper 204 is disposed in the third compartment 146 and configured to prevent the piston 118 and the partition 130 from colliding in the event of a sudden extension force $F_E$ that is higher than the biasing force of the second spring 140. In the illustrated embodiment, the bumper 204 is tube-shaped and secured concentrically outward of the piston rod 120.

In one embodiment, the suspension assembly 100 may be provided as a kit, including a plurality of first and second springs 138 and 142 having different spring characteristics. The configuration of the suspension assembly 100 may allow for a high degree of adjustability, as the first spring, the second spring, the third spring or any combination thereof can be exchanged to make the suspension assembly 100 firmer or more compliant.

Referring to FIGS. 1, 2 and 5, at least the first spring 138 is replaceable without disassembling the suspension assembly 100 or removing the suspension assembly from the bicycle 1000. To remove and replace the first spring 138 from the first compartment 144, the pinch bolts 1022 of the stem 1020 are loosened and the first end 114 is removed from the upper support 102. The first compartment 144 is thereby exposed, the first spring 138 can be easily removed and replaced with a different spring, while the upper support 102 and the lower support remain assembled and connected to the steerer tube 1008. Accordingly, one of ordinary skill in the art will realize that the configuration of the suspension assembly 100 facilitates some modification of the suspension profile without removing the suspension assembly 100 from the front fork assembly 1004 or completely disassembling the suspension assembly 100.

To change the third spring 142 and more finely tune the suspension profile, the suspension assembly 100 is removed from the bicycle 1000 and the second end cap 116 is removed from the lower tubular support 104. In the embodiment shown in FIG. 1, the second end cap 116 can be removed and disengaged from the piston rod second end 124 so that the third spring 142 may be exchanged without completely disassembling the suspension assembly 100.

The second spring 140, may be replaced one of several ways. In one manner the second spring 140 may be replaced by removing both the first and second end caps 114, 116 and disconnecting the piston rod second end 124 from the second end cap 116. The piston and piston rod 118, 122 may be removed from the first end 110 of the upper tubular support 102 and the second spring 142 exchanged. Alternatively, the second spring 140 may be replaced by removing the second end cap 116 from the lower tubular support 104 and disconnecting the partition 130 from the upper tubular support second end 111.

Figure 3:
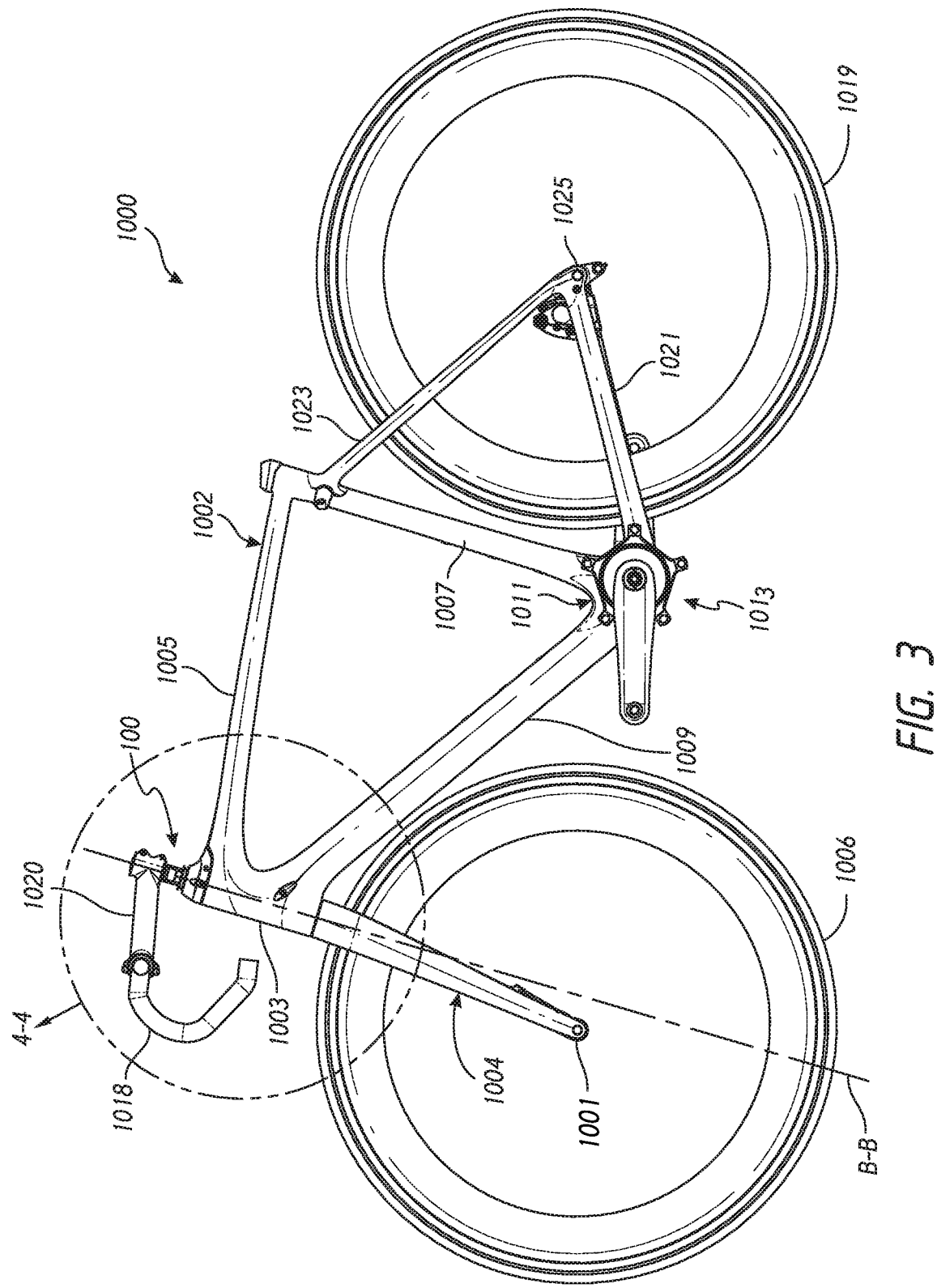
FIG. 3 shows a side-view of one embodiment of a bicycle incorporating a suspension assembly in accordance with the present disclosure.
Figure 4:
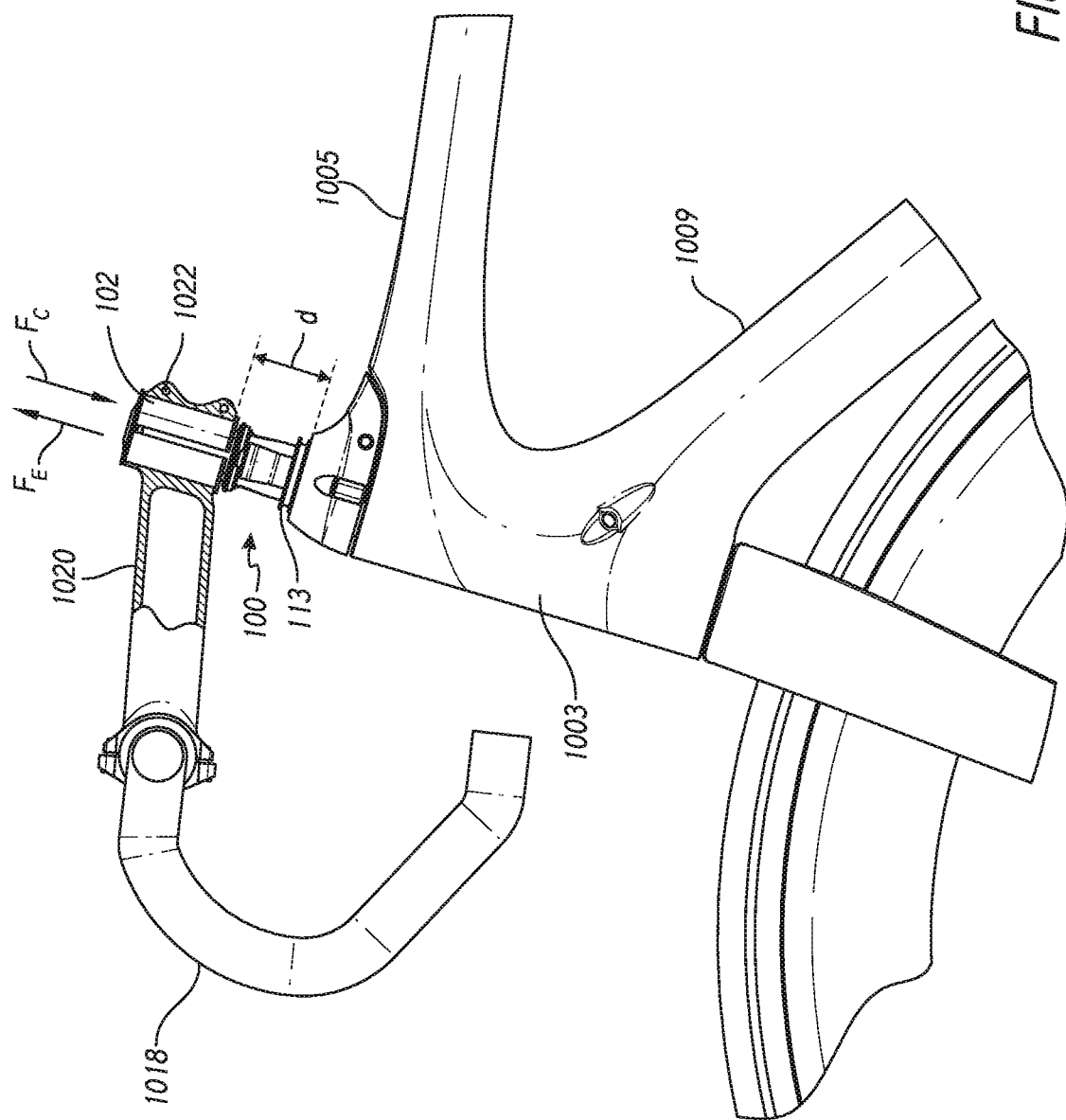
FIG. 4 shows an enlargement of the area in FIG. 3 demarcated by circle 4-4.

Referring to FIGS. 3 and 5, the bicycle 1000 of the present disclosure, allows for suspension in a direction parallel to or coaxial with the steering axis B-B. In comparison with prior art parallelogram suspension assemblies, the suspension cartridge of the present disclosure eliminates the requirement that the suspension assembly be manufactured in a number of different lengths to accommodate cyclists of different sizes. The upper and lower tubular supports 102 and 104 can be manufactured in a single size while simultaneously providing the ability to change the fit characteristics of the bicycle to suit the rider's needs, because the steering assembly 1018 is connected to the upper tubular support 102, and a commercially available stem may be used with the steering assembly 1018. As used herein the term "fit characteristics" describes the orientation of the handle bar assembly 1018 in relation to the other structural members of the bicycle frame. Accordingly, instead of manufacturing a number of custom suspension assembly components that are interchanged to provide the desired fit characteristic, commercially available stems of different lengths and angular orientations may be connected to the upper tubular support 102 as described above.

Although the foregoing systems and methods have been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein.

What is claimed is:

1. A suspension assembly for a bicycle comprising:
a lower tubular support configured to be received within a steerer tube of a bicycle fork assembly;
an upper tubular support configured to be connected to a stem of a steering assembly above an upper end of the steerer tube, the upper tubular support is longitudinally slidable relative to the lower tubular support;
a first spring configured to exert a first force that biases the upper and lower tubular supports toward an extended position,
wherein the upper and lower tubular supports are configured such that the upper tubular support slides longitudinally relative to the lower tubular support adjacent the stem and above a fork crown of the bicycle fork assembly; and
an intermediate tubular support received intermediate the upper and lower tubular supports and configured to minimize lateral movement between the upper and lower tubular supports.

2. The suspension assembly of claim 1, wherein the lower tubular support is configured to be received within the steerer tube such that an upper end of the lower tubular support is disposed above a top tube of the bicycle.

3. The suspension assembly of claim 1, further comprising a second spring disposed within one of the supports of the suspension assembly.

4. The suspension assembly of claim 3, wherein the first spring is configured to exert the first force on a first surface and a second surface, and the second spring is configured to exert a second force on a third surface and a fourth surface.

5. The suspension assembly of claim 4, wherein the second force biases the upper and lower tubular supports toward the extended position.

6. The suspension assembly of claim 4, wherein the second force biases the upper and lower tubular supports toward a compressed position.

7. The suspension assembly of claim 4, further comprising a third spring configured to exert a third force on a fifth surface and a sixth surface.

8. The suspension assembly of claim 1, wherein the suspension assembly is configured such that the first spring is replaceable without removing the lower tubular support from the steerer tube.

9. The suspension assembly of claim 1, wherein the steerer tube defines a steering axis and the suspension assembly defines a longitudinal axis parallel with the steering axis.

10. The suspension assembly of claim 9, wherein the longitudinal axis is coaxial with the steering axis.

11. The suspension assembly of claim 1, wherein the intermediate support receives a plurality of bearings.

12. The suspension assembly of claim 11, wherein the plurality of bearings comprises ball bearings or roller bearings.

13. The suspension assembly of claim 1, further comprising the bicycle fork assembly and the steering assembly.

14. A bicycle comprising:
a frame including a head tube and a front fork assembly comprising a pair of fork legs connected to a fork crown at one end thereof, and a steerer tube extending axially away from the fork crown and rotationally received in the head tube; and
a suspension assembly received within the steerer tube such that at least a portion of the suspension assembly projects above an upper end of the steerer tube, the suspension assembly including a lower tubular support and an upper tubular support longitudinally slidable relative to the lower tubular support, the lower and upper tubular supports receiving a first spring configured to exert a first force that biases the lower and upper tubular supports toward an extended position; and
a steering assembly including a stem connected to the upper tubular support;
wherein the lower and upper tubular supports are respectively connected to the steerer tube and stem such that the upper tubular support slides longitudinally relative to the lower tubular support adjacent the stem and above the fork crown, and
wherein the suspension assembly further comprises an intermediate tubular structure received intermediate the upper and lower tubular supports, wherein the intermediate tubular structure receives a plurality of bearings.

15. The bicycle of claim 14, wherein the frame further comprises a top tube connected to an upper end of the head tube, and the steerer tube is configured such that at least part of the lower tubular support is received above the top tube.

16. The bicycle of claim 14, wherein the plurality of bearings comprises at least one of the following: ball bearings or roller bearings.

17. The bicycle of claim 14, wherein the suspension assembly further comprises a second spring configured to exert a second force that biases the lower and upper tubular supports toward the extended position.

18. The bicycle of claim 14, wherein the suspension assembly further comprises a second spring configured to exert a second force that biases the lower and upper tubular supports toward a compressed position.

19. A suspension assembly for a bicycle comprising:
a lower tubular support configured to be received within a steerer tube of a bicycle fork assembly;
an upper tubular support configured to be connected to a stem of a steering assembly above an upper end of the steerer tube, the upper tubular support is longitudinally slidable relative to the lower tubular support;
a first spring configured to exert a first force that biases the upper and lower tubular supports toward an extended position; and
a second spring disposed within one of the supports of the suspension assembly,
wherein the upper and lower tubular supports are configured such that the upper tubular support slides longitudinally relative to the lower tubular support adjacent the stem and above a fork crown of the bicycle fork assembly.

20. The suspension assembly of claim 19, wherein an intermediate tubular support is received intermediate the upper and lower tubular supports and configured to resist lateral movement between the upper and lower tubular supports.

* * * * *

UNITED STATES PATENT AND TRADEMARK OFFICE
CERTIFICATE OF CORRECTION

PATENT NO. : 10,526,035 B2
APPLICATION NO. : 15/979134
DATED : January 7, 2020
INVENTOR(S) : Christopher P. D'Aluisio et al.

It is certified that error appears in the above-identified patent and that said Letters Patent is hereby corrected as shown below:

In the Specification

Column 9, Line 28, delete "FC" and insert --Fc--, therefor.

In the Claims

Column 11, Line 47, Claim 7, delete "firth" and insert --fifth--, therefor.

Signed and Sealed this
Twenty-third Day of June, 2020

Andrei Iancu
*Director of the United States Patent and Trademark Office*